United States Patent [19]
Wortham

[11] Patent Number: 5,913,170
[45] Date of Patent: Jun. 15, 1999

[54] LOCATING SYSTEM AND METHOD USING A MOBILE COMMUNICATIONS NETWORK

[75] Inventor: Larry C. Wortham, Garland, Tex.

[73] Assignee: HighwayMaster Communications, Inc., Dallas, Tex.

[21] Appl. No.: 08/340,755

[22] Filed: Nov. 16, 1994

[51] Int. Cl.⁶ .................................................. H04Q 7/20

[52] U.S. Cl. ...................... 455/457; 455/524; 455/561; 455/575; 342/357

[58] Field of Search ................................. 455/33.1, 33.2, 455/33.3, 33.4, 56.1, 12.1, 13.2, 414, 422, 426, 427, 456, 457, 517, 524, 556, 561, 575; 342/357, 450, 457; 379/59, 60

[56] References Cited

U.S. PATENT DOCUMENTS

| | | | |
|---|---|---|---|
| Re. 34,034 | 8/1992 | O'Sullivan | 379/59 |
| 3,518,674 | 6/1970 | Moorehead et al. | 343/112 |
| 3,680,121 | 7/1972 | Anderson et al. | 343/112 TC |
| 3,714,650 | 1/1973 | Fuller et al. | 343/6.5 LC |
| 3,757,290 | 9/1973 | Ross et al. | 340/23 |
| 3,789,409 | 1/1974 | Easton | 343/112 R |
| 3,848,254 | 11/1974 | Drebinger et al. | 343/112 R |
| 4,053,893 | 10/1977 | Boyer | 343/112 PT |
| 4,083,003 | 4/1978 | Haemmig | 325/6 |
| 4,107,689 | 8/1978 | Jellinek | 343/112 TC |
| 4,152,693 | 5/1979 | Ashworth, Jr. | 340/24 |
| 4,177,466 | 12/1979 | Reagan | 343/112 TC |
| 4,222,052 | 9/1980 | Dunn | 343/112 R |
| 4,382,178 | 5/1983 | Mori | 377/17 |

(List continued on next page.)

FOREIGN PATENT DOCUMENTS

| | | | |
|---|---|---|---|
| B3767589 | 4/1993 | Australia | G01S 5/00 |
| 0242099 | 10/1987 | European Pat. Off. | G01S 5/14 |
| 0290725 | 11/1988 | European Pat. Off. | H04Q 7/04 |
| 0367935 | 5/1990 | European Pat. Off. | H04Q 7/04 |
| 2221113 | 1/1993 | United Kingdom | C01S 5/00 |
| WO8904035 | 5/1989 | WIPO | G10L 5/06 |
| WO8912835 | 12/1989 | WIPO | G01S 5/02 |

OTHER PUBLICATIONS

"DCI Receives Exclusive Contract from Trimble Navigation for Integrated Differential GPS," *Differential Corrections Inc. New Release*, Aug. 5, 1993, 2 pages.

DCI Differential Correction Services Brochure and Price List, Date Unknown, 2 pages.

Author Unknown, "Test Taps Cellular Network To Measure Traffic Flow," *Inside IVHS*, Nov. 22, 1993, 3 pages.

Author Unknown, "Westinghouse Sells Off Transit Fleet Business; E–Systems Forms Firm," *Inside IVHS*, Jan. 16, 1995, 3 pages.

Author Unknown, "FCC Solicits Comments On Location Finding For Wireless 911 Calling," *Inside IVHS*, Jan. 16, 1995, 2 pages.

"Trimpack" Brochure, TrimbleNavigation, Date Unknown, 1 page.

James C. Reynolds, et al., "GPS–Based Vessel Position Monitoring and Display System," *IEEE*, 1990, pp. 601–607.

(List continued on next page.)

*Primary Examiner*—Wellington Chin
*Assistant Examiner*—Philip J. Sobutka
*Attorney, Agent, or Firm*—Baker & Botts, L.L.P.

[57] ABSTRACT

A differential positioning system (10) includes components of a satellite-based or land-based positioning system (12) and components of a mobile communications network (14). The differential positioning system (10) provides accurate and immediate position information to a mobile unit (17). A transmitter site (40) of a mobile communications network (14) is associated with a reference positioning receiver (38). The reference positioning receiver (38) generates correction data for transmission to the mobile unit (17). The mobile unit (17) includes a mobile communications device (42) for receiving the correction data generated by the reference positioning receiver (38) and a mobile positioning receiver (24) for generating a position fix. The mobile unit (17) refines the position fix generated by the mobile positioning receiver (24) using correction data received by the mobile communications device (42).

30 Claims, 3 Drawing Sheets

U.S. PATENT DOCUMENTS

| | | | |
|---|---|---|---|
| 4,428,052 | 1/1984 | Robinson et al. | 364/436 |
| 4,428,057 | 1/1984 | Setliff et al. | 364/521 |
| 4,435,711 | 3/1984 | Ho et al. | 343/389 |
| 4,445,118 | 4/1984 | Taylor et al. | 343/357 |
| 4,547,778 | 10/1985 | Hinkle et al. | 343/456 |
| 4,590,569 | 5/1986 | Rogoff et al. | 364/452 |
| 4,651,157 | 3/1987 | Gray et al. | 342/457 |
| 4,660,037 | 4/1987 | Nakamura | 340/990 |
| 4,688,244 | 8/1987 | Hannon et al. | 379/58 |
| 4,700,374 | 10/1987 | Bini | 379/60 |
| 4,728,959 | 3/1988 | Maloney et al. | 342/457 |
| 4,740,792 | 4/1988 | Sagey et al. | 342/457 |
| 4,742,357 | 5/1988 | Rackley | 342/457 |
| 4,750,197 | 6/1988 | Denekamp et al. | 379/58 |
| 4,754,465 | 6/1988 | Trimble | 375/1 |
| 4,776,003 | 10/1988 | Harris | 379/91 |
| 4,791,572 | 12/1988 | Green, III et al. | 364/449 |
| 4,809,005 | 2/1989 | Counselman, III | 342/352 |
| 4,833,477 | 5/1989 | Tendler | 342/389 |
| 4,833,701 | 5/1989 | Comroe et al. | 379/60 |
| 4,860,341 | 8/1989 | D'Avello et al. | 379/91 |
| 4,891,650 | 1/1990 | Sheffer | 342/457 |
| 4,891,761 | 1/1990 | Gray et al. | 364/452 |
| 4,897,642 | 1/1990 | DiLullo et al. | 340/825.06 |
| 4,901,340 | 2/1990 | Parker et al. | 379/60 |
| 4,907,290 | 3/1990 | Crompton | 455/56 |
| 4,908,629 | 3/1990 | Apsell et al. | 342/457 |
| 4,912,756 | 3/1990 | Hop | 379/60 |
| 4,953,198 | 8/1990 | Daly et al. | 379/61 |
| 5,003,317 | 3/1991 | Gray et al. | 342/457 |
| 5,014,206 | 5/1991 | Scribner et al. | 364/449 |
| 5,025,253 | 6/1991 | DiLullo et al. | 340/825.06 |
| 5,032,845 | 7/1991 | Velasco | 342/457 |
| 5,043,736 | 8/1991 | Darnell et al. | 342/357 |
| 5,045,861 | 9/1991 | Duffett-Smith | 342/457 |
| 5,055,851 | 10/1991 | Sheffer | 342/457 |
| 5,068,656 | 11/1991 | Sutherland | 340/989 |
| 5,090,050 | 2/1992 | Heffernan | 379/60 |
| 5,119,102 | 6/1992 | Barnard | 342/357 |
| 5,121,126 | 6/1992 | Clagett | 342/419 |
| 5,131,019 | 7/1992 | Sheffer et al. | 379/39 |
| 5,142,281 | 8/1992 | Park | 340/991 |
| 5,142,654 | 8/1992 | Sonberg et al. | 379/59 |
| 5,155,490 | 10/1992 | Spradley, Jr. et al. | 342/357 |
| 5,159,625 | 10/1992 | Zicker | 379/59 |
| 5,166,694 | 11/1992 | Russell et al. | 342/457 |
| 5,208,756 | 5/1993 | Song | 364/449 |
| 5,223,844 | 6/1993 | Mansell et al. | 455/456 X |
| 5,225,842 | 7/1993 | Brown et al. | 342/357 |
| 5,243,529 | 9/1993 | Kashiwazaki | 364/449 |
| 5,252,982 | 10/1993 | Frei | 342/357 |
| 5,261,118 | 11/1993 | Vanderspool, II et al. | 455/51.2 |
| 5,299,132 | 3/1994 | Wortham | 364/460 |
| 5,311,194 | 5/1994 | Brown | 342/357 |
| 5,317,323 | 5/1994 | Kennedy et al. | 342/457 |
| 5,323,322 | 6/1994 | Mueller et al. | 364/449 |
| 5,327,144 | 7/1994 | Stilp et al. | 342/387 |
| 5,334,974 | 8/1994 | Simms et al. | 340/990 |
| 5,365,516 | 11/1994 | Jandrell | 370/18 |
| 5,389,934 | 2/1995 | Kass | 342/357 |
| 5,392,052 | 2/1995 | Eberwine | 342/357 |
| 5,392,458 | 2/1995 | Sasuta et al. | 455/54.1 |
| 5,396,540 | 3/1995 | Gooch | 379/59 |
| 5,400,020 | 3/1995 | Jones et al. | 340/994 |
| 5,406,491 | 4/1995 | Lima | 342/457 X |
| 5,422,813 | 6/1995 | Schuchman et al. | 455/56.1 X |
| 5,422,816 | 6/1995 | Sprague et al. | 364/449 |
| 5,432,841 | 7/1995 | Rimer | 379/59 |
| 5,444,444 | 8/1995 | Ross | 340/994 |
| 5,463,554 | 10/1995 | Araki et al. | 364/444 |
| 5,587,715 | 12/1996 | Lewis | 455/12.1 |
| 5,600,706 | 2/1997 | Dunn et al. | 379/60 X |

OTHER PUBLICATIONS

R. DeSadaba, "Personal Communications in the Intelligent Network," *British Telecommunications Engineering*, vol. 9, Aug., 1990, pp. 80–83.

"GPS Navstar Global Positioning System User's Overview—YEE–82–009D," *Navstar Global Positioning System Joint Program Office*, Mar., 1991, pp. 1–164.

"U.S. Coast Guard Differential GPS" Brochure, *U.S. Department of Transportation, United States Coast Guard*, May, 1993.

"GPS Facts & Figures" Brochure, *U.S. Department of Transportation, United States Coast Guard*, May, 1993.

D. H. Alsip, J. M. Butler, and J. T. Radice, "Implementation of the U.S. Coast Guard's Differential GPS Navigation Service," *U.S. Coast Guard Headquarters, Office of Navigation Safety and Waterway Services, Radionavigation Division*, Jun. 28, 1993, pp. 1–10.

"Motorola GPS Technical Reference Manual," *Motorola*, Oct., 1993, Manual Cover, Title Page, and pp. 4–109.

Don Burtis, "CDPD—A Bandwidth Optimization Technique for Cellular Telephones," *Computer Design's OEM Integration*, May, 1994, pp. 19–20.

"U.S. Coast Guard Bulletin Board System File FRP–DGPS,'" *U.S. Coast Guard*, Date Unknown, pp. 1–6.

Gene L. Schlechte, LCDR, "U.S. Coast Guard Bulletin Board System Document 'Design. TXT'—Design Process for the United States Coast Guard's Differential GPS Navigation Service," *U.S. Coast Guard, U.S. Coast Guard Omega Navigation System Center*, Date Unknown, pp. 1–21.

"Appendix B, The 1991 Radionavigation User Conference," *Department of Transportation*, Date Unknown, pp. 1–2.

LOCATING SYSTEM AND METHOD USING A MOBILE COMMUNICATIONS NETWORK

TECHNICAL FIELD OF THE INVENTION

This invention relates to locating systems, and more particularly to a locating system and method using a mobile communications network.

BACKGROUND OF THE INVENTION

Mobile communications technology has enjoyed substantial growth over the past decade. Many cars, trucks, airplanes, boats, and other vehicles are equipped with devices that allow convenient and reliable mobile communication through a network of satellite-based or land-based transceivers. Advances in this technology have also led to widespread use of hand-held, portable mobile communications devices.

Many customers of mobile communications systems also require an accurate determination of their position, and perhaps reporting of this position to a remote location. For example, a cellular telephone in a vehicle or carried by a person offers a convenient communication link to report position information. The position information may be generated by traditional positioning systems, including a satellite-based positioning system such as the global positioning system (GPS), or a land-based positioning system, such as LORAN-C. These approaches, however, may not be suitable for particular applications that require great position accuracy.

SUMMARY OF THE INVENTION

In accordance with the present invention, the disadvantages and problems associated with previous techniques used to locate and report the position of a vehicle, person, or object equipped with a mobile communications device have been substantially reduced or eliminated. One aspect of the present invention provides a differential positioning system that integrates positioning technology with an existing mobile communications infrastructure.

According to an embodiment of the present invention, a locating system using a cellular telephone network and a positioning system includes a reference positioning receiver having known position coordinates. The reference positioning receiver receives first position signals from the positioning system and generates correction data in response to the first position signals and the known position coordinates. A transmitter site of the cellular telephone network is coupled to the reference positioning receiver and transmits the correction data generated by the reference positioning receiver. A mobile unit in communication with the cellular telephone network and the positioning system receives correction data transmitted by the transmitter site. The mobile unit also receives second position signals from the positioning system and determines the location of the mobile unit in response to the second position signals and the correction data.

According to another embodiment of the present invention, a system for locating a mobile unit within the service area of a mobile communications network includes a plurality of transmitter sites having known position coordinates, each transmitter site broadcasting time-of-arrival (TOA) data. A mobile communications device on the mobile unit receives the TOA data transmitted by at least three transmitter sites. A memory on the mobile unit stores known position coordinates of the transmitter sites. A processor receives the TOA data from the mobile communications device and determines the position of the mobile unit in response to the TOA data received from the transmitter sites and the known position coordinates of the transmitter sites stored in the memory.

Important technical advantages of the present invention include improving the accuracy of existing positioning systems using a mobile communications system. In particular, existing transmitter sites of a mobile communications network may be used as reference points to transmit position correction data to mobile units within the mobile communications network service area. Other important technical advantages include integration of communicating, locating, and reporting functions for an overall reduction in the cost and complexity of the system. For example, a differential GPS (DGPS) positioning system may use an existing communications link, such as the overhead message stream of a cellular telephone network, to send correction data from the transmitter site to the mobile unit. Important technical advantages may also include accurate and immediate position fixes without relying on calculations performed at a remote location. Other important technical advantages may also include implementation of a time-of-arrival (TOA) positioning system within the mobile communications network without land-based or satellite-based positioning technology. Other technical advantages are readily apparent to one skilled in the art from the following figures, description, and claims.

BRIEF DESCRIPTION OF THE DRAWINGS

For a more complete understanding of the present invention and for further features and advantages, reference is now made to the following description taken in conjunction with the accompanying drawings, wherein like reference numerals represent like parts, in which.

DETAILED DESCRIPTION OF THE INVENTION

Figure 1:
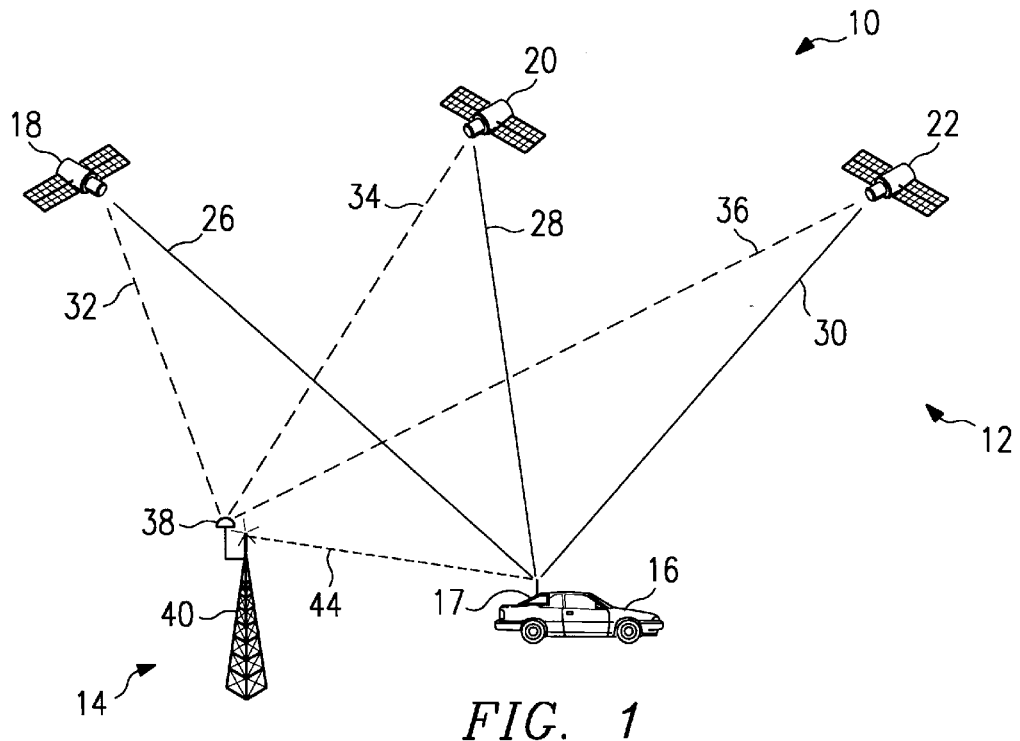
FIG. 1 illustrates a differential positioning system.

FIG. 1 illustrates several components used in a differential positioning system 10. The system includes components of a satellite-based or land-based positioning system 12 and components of a mobile communications network 14. Differential positioning system 10 provides accurate and immediate position information to vehicle 16 equipped with a mobile unit 17.

Positioning system 12 is illustrated as a satellite-based radio navigation system, such as the NAVSTAR positioning system (GPS). The description uses the NAVSTAR GPS as a representative positioning system 12, but any land-based or satellite-based system may be used. For example, positioning system 12 may be a land-based LORAN-C, a space-based GLONASS, or any other appropriate positioning technology. In general, positioning system 12 comprises a plurality of space-based or land-based transmitters that emit position signals.

The NAVSTAR GPS consists of a number of satellites in approximately twelve hour, inclined orbits of the earth, each satellite transmitting position signals. The GPS concept of operation is based upon satellite ranging. With position signals from three satellites, a GPS receiver can make an accurate calculation of its position in three dimensions. To make a valid position fix, the GPS receiver measures the propagation times of position signals from the satellites to a very high accuracy. This is accomplished by synchronizing the transmission of position signals to an atomic clock. However, to reduce costs and complexity, the GPS receiver may not maintain such an accurate clock, which introduces a clock bias ($C_B$) between the satellite clock and the GPS receiver clock. By measuring the apparent satellite signal propagation times from four satellites rather than three, the redundancy can be used to solve $C_B$. The signal propagation times correspond to ranges of the GPS receiver from the satellites, related by the speed of light. Prior to correction for the clock bias $C_B$, the apparent ranges of the satellites are all in error by a fixed amount and are called pseudoranges.

Two positioning services are provided by the NAVSTAR GPS. The precise positioning service (PPS) which is reserved for military use provides accuracy to within twenty-one meters (2 drms). The statistical term "2 drms" refers to a value that falls within two standard deviations (using the root-mean-squared method) of the sampled performance data mean. Therefore, a stated accuracy of twenty-one meters (2 drms) means that the position error has an error of less than twenty-one meters approximately ninety-five percent of the time.

The standard positioning service (SPS) which is available for general use provides accuracy to within thirty meters (2 drms). However, the SPS signal accuracy is intentionally degraded to protect U.S. national security interests. This process, called selective availability, degrades the accuracy of SPS position fixes to within one hundred meters (2 drms). The SPS may be degraded in a number of ways, for example, by providing slightly inaccurate satellite orbital data to the receivers or by dithering the ranging information. Certain applications require better accuracy than provided by degraded SPS, SPS, or even PPS.

Differential GPS technology (DGPS) may provide location accuracies to within three meters (2 drms). Such accuracies allow, for example, accurate positioning of a delivery truck on a street map or precise locating for an in-vehicle navigation system. The precision of the GPS system is improved by broadcasting differential correction data to a GPS receiver. A typical DGPS positioning system, such as the one implemented by the U.S. Coast Guard, uses known position coordinates of a reference station to compute corrections to GPS parameters, error sources, and resultant positions. This correction data is transmitted to GPS receivers to refine received position signals or computed position.

Traditional DGPS positioning systems require the user to carry both a GPS receiver and an additional communications device to receive the correction data. For example, the Coast Guard implementation requires a maritime radio beacon receiver to obtain GPS correction data. This Coast Guard system is described in a document entitled "Implementation of the U.S. Coast Guard's Differential GPS Navigation Service," U.S.C.G. Headquarters, Office of Navigation Safety and Waterway Services, Radio Navigation Division, Jun. 28, 1993. Another system, described in U.S. Pat. No. 5,311,194, entitled "GPS Precision Approach and Landing System for Aircraft" and issued to Brown, describes a differential GPS implementation for use in a precision approach and landing system for aircraft. In this system, the aircraft is required to carry a broadband GPS receiver with added functionality to receive pseudolite signals that contain the correction data.

Differential positioning system 10 in FIG. 1 implements the DGPS concept using positioning system 12 integrated with mobile communications network 14 to accurately determine the location of vehicle 16. Differential positioning system 10 utilizes components of mobile communications network 14 as reference stations that provide correction data to vehicle 16 over an existing communications link, such as the control channel, overhead message stream, or paging channel of a cellular telephone network. Mobile communications network 14 may be a cellular telephone network, specialized mobile radio (SMR), enhanced specialized mobile radio (ESMR), a personal communications service (PCS), a satellite-based or land-based paging system, a citizen's band (CB), a dedicated radio system, such as those used by police and firefighters, or any other appropriate mobile communications technology.

Differential positioning system 10 is described with reference to location of vehicle 16. The present invention contemplates location of all types of vehicles, including cars, trucks, airplanes, boats, barges, rail cars, truck trailers, or any other movable object that is desirable to locate or track. Furthermore, differential positioning system 10 can also be used to accurately locate a person carrying a portable or hand-held mobile unit 17. Potential applications of this technology may include delivery service dispatch, less-than-full-load (LTL) trucking applications, in-vehicle navigation systems, surveying applications, collision avoidance, emergency location using mobile 911 services, or any other application requiring accurate positioning information of a vehicle, object, or person.

Differential positioning system 10 provides a more accurate position fix than currently available navigation services, and may provide these fixes near instantaneously or "on the fly." In some applications, low frequency and low accuracy updates are sufficient, but other applications may need better accuracy and higher frequency updates in near real-time. For example, a delivery truck may require accurate, high frequency position fixes for in-vehicle navigation to locate a specific delivery address or to provide real-time directions to the driver. Differential positioning system 10 may provide these high frequency updates without relying on off-vehicle computations prevalent in previous DGPS implementations. In addition, the same delivery truck may send lower frequency position reports to a remote location. These position reports may be sent at fixed time intervals, on-demand, or as a result of a predetermined reporting event. Differential positioning system 10 may provide both low and high frequency position fixes and reports in such a hybrid navigation and position reporting system.

Satellite-based positioning system 12 is a navigation system using NAVSTAR GPS, GLONASS, or other satellite-based or land-based radio navigation system to provide ranging data to mobile unit 17. Satellites 18, 20, 22 maintain accurate and synchronized time and simultaneously transmit position signals that contain satellite specific and system information required by mobile unit 17 to generate position fixes. The position signals transmitted by satellites 18, 20, 22 may include high precision clock and ephemeris data for a particular satellite, low precision clock and ephemeris (called "almanac") data for every satellite in the constellation, health and configuration status for all satellites, user text messages, and parameters describing the offset between GPS system time and UTC.

Mobile unit 17 receives position signals over message data streams 26, 28, 30 from satellites 18, 20, 22, respectively. Additional satellites (not shown) may also communicate message data streams to mobile unit 17. Typically, mobile unit 17 receives at least four satellite message data streams to solve for position information independent of inherent clock bias ($C_B$) between positioning system 12 and mobile unit 17. Currently the NAVSTAR GPS system has twenty-one active satellites at 11,000 mile orbits of fifty-five degrees inclination with the equator. In normal conditions, mobile unit 17 may receive position signals from seven satellites.

Using information from position signals 26, 28, 30 and optionally additional message data streams, mobile unit 17 may determine its position using accurate satellite position information transmitted by satellites 18, 20, 22 and pseudorange data represented by the time of arrival of message data streams 26, 28, 30 to mobile unit 17. Using SPS this position fix may be accurate to within 30 meters (2 drms) or 100 meters (2 drms) when selective availability degradation is activated. If mobile unit 17 is allowed to operate using PPS, then the position fix may be accurate to within 21 meters (2 drms).

Figure 4:
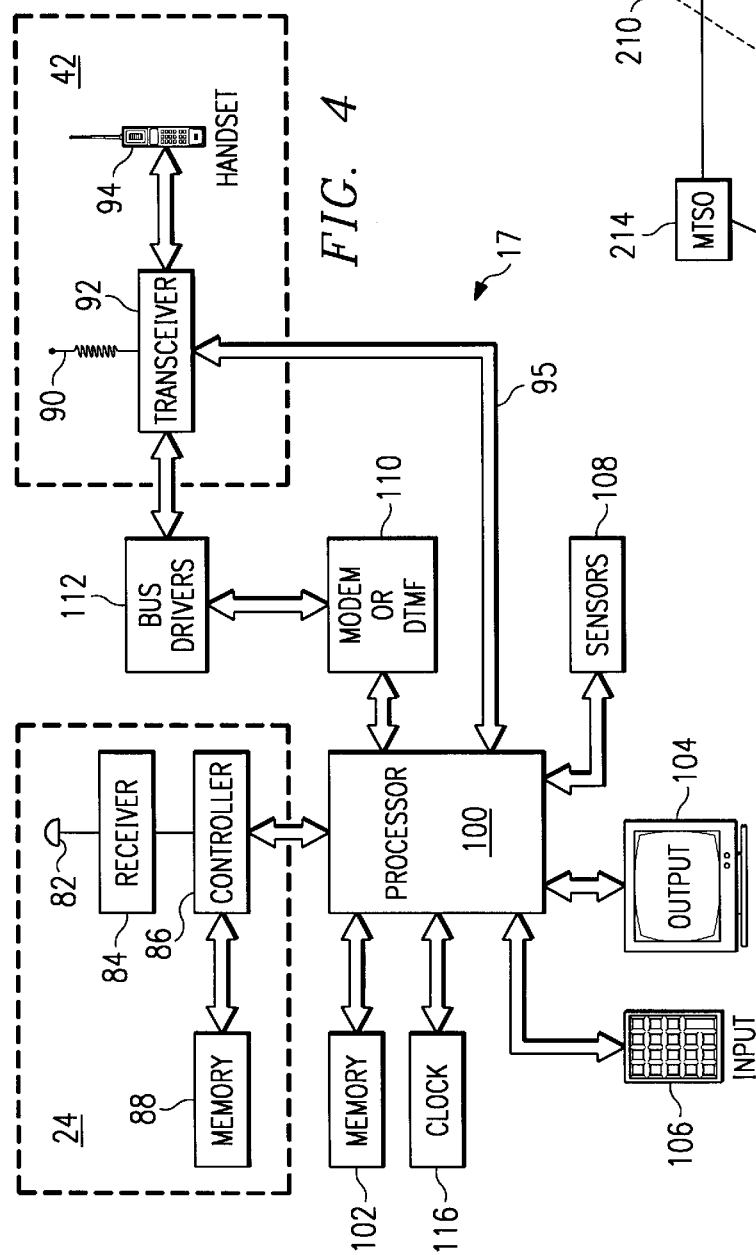
FIG. 4 is a schematic representation of a mobile unit.

To provide a more accurate position fix for mobile unit 17, satellites 18, 20, 22 also transmit message data streams 32, 34, 36, respectively, to a reference positioning receiver 38 on or in proximity to a transmitter site 40 of mobile communications network 14. Reference positioning receiver 38 performs similar calculations to determine a position fix from position signals received from satellites 18, 20, 22. Reference positioning receiver 38 compares the computed position fix to known position coordinates and generates correction data for transmission over correction data stream 44 to mobile unit 17 for further refinements of position fix provided by mobile positioning receiver 24 (FIG. 4).

The known position coordinates of transmitter site 40 may be determined by traditional surveying techniques. In addition, reference positioning receiver 38 may perform position fixes over a statistically significant period of time to determine the known position coordinates. Filtering or averaging position fixes by reference positioning receiver 38 over time removes or substantially reduces the effect of selective availability degradation and may provide a more accurate position determination than uncorrupted SPS or even PPS.

One type of correction data generated by reference positioning receiver 38 is a position correction which is applied to the position fix of mobile positioning receiver 24 (FIG. 4) of mobile unit 17 to achieve a more accurate position fix. The position correction may be in latitude/longitude, compass direction and distance, or any other appropriate coordinate system. When using a GPS positioning system 12, this technique provides accurate correction data when mobile unit 17 and reference positioning receiver 38 are located in a satellite common view area of approximately thirty square miles. In the satellite common view area all receivers operating in positioning system 12 receive approximately the same pseudorange errors assuming they are all listening to the same group of satellites 18, 20, 22. This correction method places less correction data in correction data stream 44 than other methods, but the validity of those correction terms decreases rapidly as the distance between mobile unit 17 and reference positioning receiver 38 increases. The usefulness of this correction method is impaired when mobile unit 17 and reference positioning receiver 38 compute their position fixes using position signals from different satellites. Furthermore, this method requires that both mobile unit 17 and reference positioning receiver 38 compute a navigation solution.

In an alternative correction method, reference positioning receiver 38 computes pseudorange corrections (PRCs) to each satellite 18, 20, 22, which are then transmitted over correction data stream 44 to mobile unit 17 to refine its navigation solution. The PRCs for satellites 18, 20, 22 in view of reference positioning receiver 38 are the difference between the pseudorange and the computed range to each satellite 18, 20, 22 based on the known position coordinates of reference positioning receiver 38. Each PRC message includes an identification of the satellite 18, 20, 22 and a linear measure of the PRC. Although this method may include more transmission of data, it may result in a more accurate position fix. Furthermore, such a scheme provides additional flexibility to allow mobile unit 17 to use navigation data from any of the satellites that reference positioning receiver 38 has furnished PRCs.

An additional correction method generates position corrections based on possible combinations of satellites 18, 20, 22 currently in view of reference positioning receiver 38. This approach may be computationally intensive at reference positioning receiver 38, but would allow for a simple adjustment of the solution computed by mobile unit 17. The number of position corrections (PCs) may be computed using the following formula:

$$\text{No. of } PCs = \frac{n!}{r!(n-r)!}$$

where n is the number of satellites in the common view area and r is the number of satellites used in the position correction calculation. For example, for a position fix using four satellites and with six satellites in the satellite common view area, reference positioning receiver 38 would have to generate fifteen PCs corresponding to fifteen combinations of four satellites each.

Each satellite 18, 20, 22 sends an identifier in its respective message data stream. Both mobile unit 17 and reference positioning receiver 38 may use these identifiers to generate satellite group IDs (SGIDs) that identify the specific combination of satellites used for a position fix. Reference receiver 38 may generate the position correction for fifteen combinations (four satellites chosen from a total of six), and tag the position corrections with the appropriate SGIDs. Mobile unit 17, having determined an SGID for its position fix, may then choose the proper position correction identified by the same SGID to ensure that mobile unit 17 and reference positioning receiver 38 use the same combination of satellites. Using this scheme with the NAVSTAR GPS, there would be 10,626 unique SGIDs for satellite combinations of four out of twenty-four satellites in the planned constellation.

The size and structure of a correction data message generated by reference positioning receiver 38 and transmitter over correction data stream 44 depends on the correction method employed and the precision required. A single pseudorange correction (PRC) message for a satellite in the satellite common view area may include a satellite ID, the range correction in a selected precision, and other associated portions of the message, such as a header, delimiter, and checksum. A typical PRC message for six satellites described in the Motorola GPS Technical Reference Manual (October 1993) is fifty-two bytes long, including the header, delimiter, and checksum.

The size and structure of a single position correction message also depends on the precision required and the transmission protocol. A typical position correction message may include a four byte SGID (1 through 10,626), a one byte latitude correction, and a one byte longitude correction. A multiple position correction message for fifteen satellite combinations (four satellites chosen from a total of six) may total 90 bytes of correction data. Appropriate header, delimiter and checksum bytes consistent with the communication protocol of mobile communications network 14 may be added.

The precision of pseudorange or position corrections depends on the anticipated range of error and the number of bytes allocated to the correction data. For example, one byte of eight bits may provide correction in the range of +/−127 meters with one meter bit resolution. One byte may also provide correction in 0.25 meter bit resolution over a range of approximately +/−32 meters. The precision, correction range, and byte allocation is a design choice that considers various factors, such as the available bandwidth in correction data stream 44, the accuracy of the unrefined position fix at mobile unit 17, the correction method employed, and the inherent inaccuracies of positioning system 12.

Correction data stream 44 allows correction data to be transmitted from reference positioning receiver 38 to mobile unit 17. In one embodiment, correction data stream 44 may be the control channel, paging channel, or overhead message stream currently implemented in cellular telephone technology. Currently, the control channel provides paging of incoming calls, hand-off instructions, and other features of the cellular telephone network, but may be modified by one skilled in the art to include transmission of correction data. Correction data stream 44 may also be implemented using any other communication link between transmitter site 40 and mobile communications device 42 (FIG. 4) in mobile unit 17, whether or not the communication link requires seizing of a voice or data channel.

There are several developing technologies that may provide a convenient implementation of correction data stream 44. For example, cellular digital packet data (CDPD) technology allows integration of data and voice using the existing cellular telephone infrastructure. In a CDPD system, digital packets of data and analog voice segments share the same channel. Other developments in digital cellular communications, such as code division multiple access (CDMA) and time division multiple access (TDMA), allow digital data and digital voice signals to be interspersed on a communications channel. These technologies integrate digital data transmission in a mobile communications network 14, and therefore provide a convenient implementation scheme for correction data stream 44.

Using the technologies mentioned above or other appropriate digital communications link, transmitter site 40 may either continuously broadcast correction data over correction data stream 44, such as in the control channel of the cellular telephone network, or only send correction data to mobile unit 17 when requested by a feature code request or by any other appropriate manner. Transmitter site 40 may send correction data to mobile unit 17 in one large packet or in several smaller packets interspersed with other data used for mobile communications. The correction data may be packaged in existing, but unused, bytes of the control channel or in a dedicated protocol. One possible implementation would place correction data in the extended protocol described in the EIA/TIA-533 mobile communications standard, which provides for bidirectional communication between transmitter site 40 and mobile unit 17.

Reference positioning receiver 38 may continuously receive position updates and continuously compute correction data for transmission to mobile unit 17 over correction data stream 44. Alternatively, reference positioning receiver 38 may send correction data over correction data stream 44 at predetermined time intervals, at designated times when correction data stream 44 can accommodate the additional traffic, or when requested by mobile unit 17.

Reference positioning receiver 38 may include an additional capability to ensure that correction data transmitted to mobile unit 17 by transmitter site 40 is current. This may be accomplished by including a time stamp in the correction data message to account for latency in the system. Using GPS technology as an example, satellites 18, 20, 22 in positioning system 12 provide position navigation data each second. Reference positioning receiver 38 may include an additional byte that indicates the delay in seconds of the correction data. The mobile unit 17 may save time-stamped position signals and later synchronize and correct the position signals with the time-stamped correction data received from transmitter site 40. The post-processing to refine past position fixes may be performed by mobile positioning receiver 24 (FIG. 4) or other separate processor in mobile unit 17.

Correction data stream 44 may be part of the control channel, part of a seized voice or data channel, or a separate channel requiring mobile unit 17 to re-tune to the correction data stream channel to receive valid corrections for the area. Mobile unit 17 may continuously monitor correction data stream 44 transmitted from transmitter site 40. Furthermore, mobile unit 17 may alternately tune between several correction data streams 44 from several transmitter sites 40 to determine the strongest signal, usually relating to the nearest transmitter site 40. This strongest channel select feature of mobile unit 17 assures that reference positioning receiver 38 and mobile unit 17 will be in close proximity and receive position signals from the same group or nearly the same group of satellites 18, 20, 22. For a typical transmitter site spacing in a cellular telephone network, the distance between mobile unit 17 and reference positioning receiver 38 may be less than five miles, well within the satellite common view area of the GPS system.

Differential positioning system 10, as illustrated in FIG. 1, contemplates placing reference positioning receiver 38 on each transmitter site 40 within mobile communications network 14. When using GPS technology as positioning system 12 and a cellular telephone network as mobile communications network 14, the satellite common view area may be much larger than the coverage area of a single transmitter site 40, thereby obviating the need to have reference positioning receivers 38 on each transmitter site 40. For example, differential positioning system 10 may include reference positioning receivers 38 on selected transmitter sites 40 of mobile communications network 14. In this configuration, mobile unit 17, which may be capable of simultaneously monitoring correction data streams 44 from multiple transmitter sites 40, may still receive correction data from a transmitter site 40 that is currently not providing communication service to mobile unit 17. Selected transmitter sites 40 equipped with reference positioning receivers 38 may be spaced so that mobile unit 17 located anywhere in mobile communications network 14 can receive correction data of sufficient signal strength from one of the selected transmitter sites 40 equipped with reference positioning receivers 38.

Figure 2:
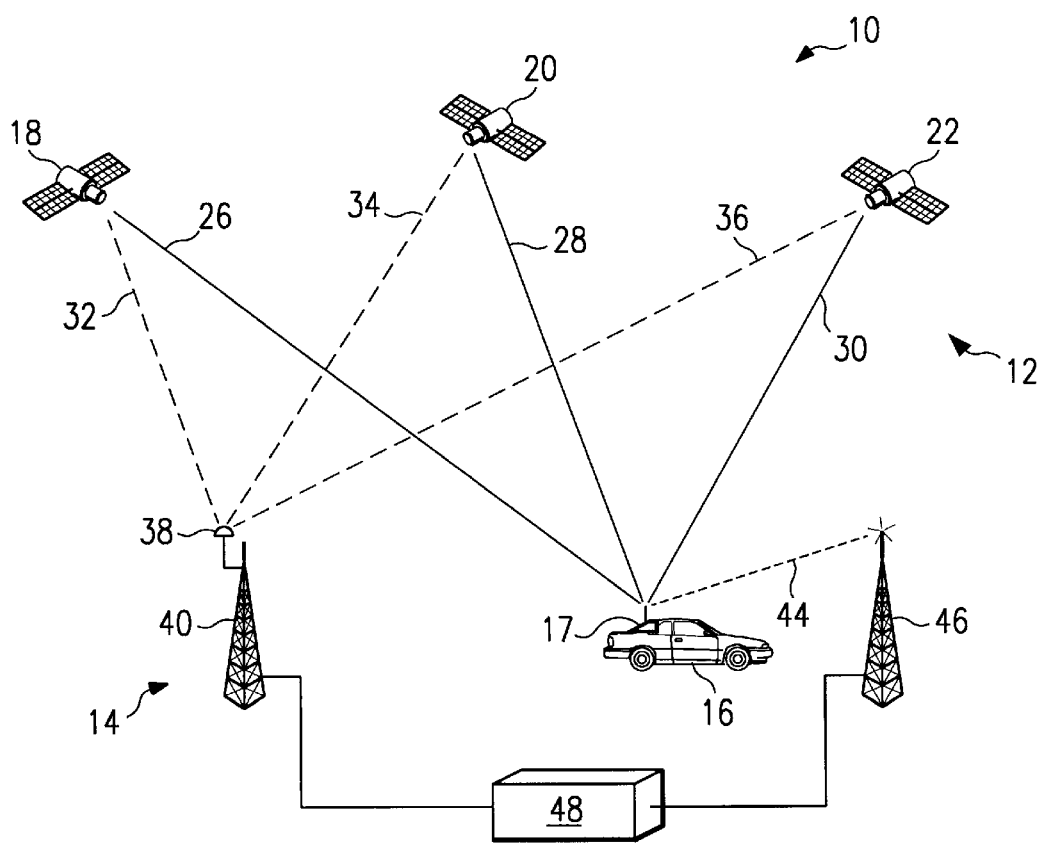
FIG. 2 illustrates an alternative embodiment of the differential positioning system of FIG. 1.

FIG. 2 shows an alternative embodiment of differential positioning system 10 that places reference receivers 38 on selected transmitter sites 40 in mobile communications network 14. As in FIG. 1, transmitter site 40 is associated with reference positioning receiver 38, which receives position signals in message data streams 32, 34, 36 from satellites 18, 20, 22, respectively. However, mobile unit 17 is located in an area serviced by transmitter site 46, which is not equipped with reference positioning receiver 38. Furthermore, mobile unit 17 is unable to receive correction data directly from transmitter site 40 due to the inability to monitor communications from transmitter sites 40 and 46, the distance from transmitter site 40, or other reasons. However, mobile unit 17 is close enough to reference positioning receiver 38 to receive navigation data from at least a subset of satellites 18, 20, 22 serving reference positioning receiver 38. Using any of the correction methods described above with reference to FIG. 1, reference positioning receiver 38 generates correction data and transmits this correction data through link 48 to transmitter site 46. Transmitter site 46 transmits correction data generated by reference positioning receiver 38 over correction data stream 44 to mobile unit 17. Mobile unit 17 uses the correction data to refine a position fix derived from position signals received from satellites 18, 20, 22 over message data streams 26, 28, 30.

Differential positioning system 10, illustrated in FIG. 2, reduces the number of reference positioning receivers 38 required by networking correction data through link 48 between transmitter sites 40, 46. Link 48 between transmitter sites 40, 46 may include microwave communications, bidirectional paging or control channels, direct land-line connections, switching stations such as MTSOs, or any other appropriate communications device to send correction data from transmitter site 40 to transmitter site 46.

Figure 3:
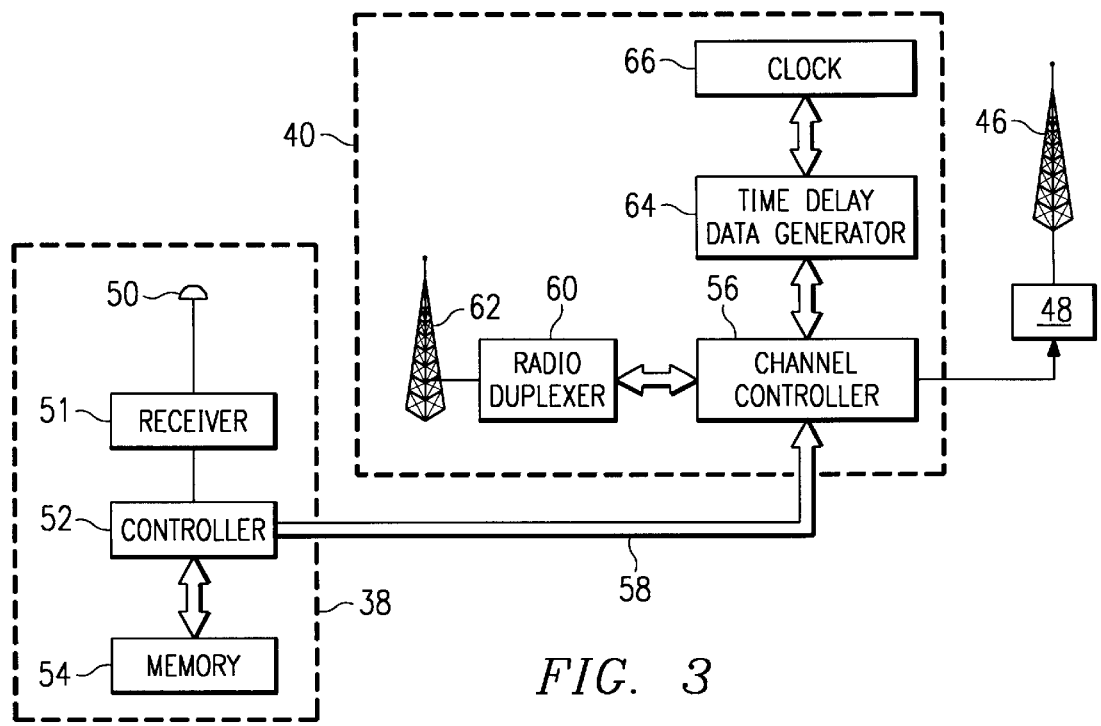
FIG. 3 is a schematic representation of a transmitter site associated with a reference positioning receiver.

FIG. 3 is a schematic representation of transmitter site 40 associated with reference positioning receiver 38. Reference positioning receiver 38 may be mounted directly on transmitter site 40 or on a separate structure or mounting. Reference positioning receiver 38 includes an antenna 50, receiver 51, controller 52, and memory 54. The following description relates to the operation of reference positioning receiver 38 with a GPS positioning system, however, the same concepts apply to other land-based and satellite-based positioning systems.

Reference positioning receiver 38 receives position signals in message data streams 32, 34, 36 from satellites 18, 20, 22, respectively. The position signals include navigation data, such as ephemeris, almanac, and clock correction data. Ephemeris data includes detailed information about the specific satellite course over the next two hours, the almanac data includes less detailed information about the complete satellite constellation for a longer period, and the clock correction data includes information to correct for clock errors. The satellite transmissions received by antenna 50 consist of a direct sequence spread spectrum signal containing the ephemeris, almanac, and clock correction data at a rate of fifty bits per second. In the case of the SPS, a pseudorandom noise signal with a chip rate of 1.023 MHz that is unique to each satellite is used to spread the spectrum of the information which is then transmitted on a center frequency of 1575.42 MHz.

Receiver 51 receives satellite position signals having a bandwidth of approximately 2 MHz and a signal-to-noise ratio of approximately −20 dB. The relative movement between satellites 18, 20, 22 and reference positioning receiver 38 causes an additional Doppler frequency offset from the GPS center frequency. To recover the navigation data and measure the propagation time of the satellite position signals, receiver 51 must cancel or allow for the Doppler frequency offset and generate the proper coarse/acquisition code associated with each satellite 18, 20, 22 to despread the signal. Once synchronization with the pseudorandom noise signal is achieved, receiver 51 may extract the ephemeris, almanac, and clock correction data and pass this information to controller 52.

Controller 52 receives navigation data from at least three satellites and uses this information to determine a navigation solution based on well-known triangulation techniques. In a four satellite fix, with each satellite position represented by coordinates $(X_n, Y_n, Z_n)$ with the indice n equal to one through four, the position coordinates (X, Y, Z) of reference positioning receiver 38 may be determined by solving the following equations:

$$(X_1 - X)^2 + (Y_1 - Y)^2 + (Z_1 - Z)^2 = (R_1 - C_B)^2$$
$$(X_2 - X)^2 + (Y_2 - Y)^2 + (Z_2 - Z)^2 = (R_2 - C_B)^2$$
$$(X_3 - X)^2 + (Y_3 - Y)^2 + (Z_3 - Z)^2 = (R_3 - C_B)^2$$
$$(X_4 - X)^2 + (Y_4 - Y)^2 + (Z_4 - Z)^2 = (R_4 - C_B)^2$$

where $R_1$, $R_2$, $R_3$, $R_4$ are pseudorange measurements from the satellites and $C_B$ is a common clock bias. Controller 52 may use certain data stored in memory 54 to arrive at a navigation solution. Controller 52 may then compare the instantaneous navigation solution (X, Y, Z) to known position coordinates $(X_0, Y_0, Z_0)$ stored in memory 54 to generate position correction data in latitude/longitude, compass direction and distance, or other appropriate coordinate system.

In an alternative embodiment, controller 52 may receive ephemeris, almanac, and clock correction data from satellites 18, 20, 22 and compute a pseudorange $(R_N)$ for each satellite. Since the satellite signal contains information on the precise satellite orbits and controller 52 has known position coordinates $(X_0, Y_0, Z_0)$ stored in memory 54, the true range to each satellite 18, 20, 22 can be calculated. By comparing the true range and the measured pseudorange, a pseudorange correction (PRC) for each satellite 18, 20, 22 may be computed and sent as correction data. As described above with reference to FIG. 1, controller 52 may also provide position correction data based on navigation solutions using all possible combinations of satellites 18, 20, 22 currently in view of reference positioning receiver 38.

Correction data in any of the various forms described above is sent by controller 52 to channel controller 56 of transmitter site 40 over communication link 58. Communication link 58 may be a direct wire connection, a radio communication link, a connection through a switched telephone system, or other appropriate communication link. Depending on the configuration of differential positioning system 10, channel controller 56 may send correction data to radio duplexer 60 for transmission over transmitter site antenna 62 to mobile unit 17. Alternatively, channel controller 56 may pass correction data through link 48 to transmitter site 46 currently serving mobile unit 17.

Also shown in FIG. 3 as part of transmitter site 40 are time-of-arrival (TOA) data generator 64 and clock 66 that may be used in an alternative positioning system 200 described with reference to FIG. 6. TOA data generator 64 generates a TOA data message and sends this message to channel controller 56 for transmission to mobile unit 17 over transmitter site antenna 62. The TOA data message may include a precise time of transmission based on information maintained by clock 66. Clock 66 and TOA data generator 64 are shown as elements of transmitter site 40, but it should be understood that their functions may also be implemented in a central or distributed device accessible by transmitter sites 40, 46 of mobile communications network 14.

FIG. 4 is a schematic representation of a mobile unit 17 that includes mobile positioning receiver 24, mobile communications device 42, and other associated hardware and software, described below. Mobile positioning receiver 24 is similar in construction and function to reference positioning receiver 38 and includes an antenna 82, receiver 84, controller 86, and memory 88. In operation, mobile positioning receiver 24 receives position signals from satellites 18, 20, 22 over message data streams 26, 28, 30 at antenna 82. Receiver 84 processes these signals to extract ephemeris, almanac, and clock correction data. Controller 86 receives this information and computes a navigation solution or pseudorange measurements. These calculations performed by controller 86 may use data stored in memory 88.

Mobile communications device 42 includes an antenna 90, transceiver 92, and hand set 94. In operation, mobile communications device 42 receives correction data at antenna 90 over correction data stream 44. The correction data may be transmitted directly from transmitter site 40 equipped with reference positioning receiver 38 as described with reference to FIG. 1, or indirectly through link 48 and transmitter site 46 as described with reference to FIG. 2. As described above, the correction data may be in a variety of forms, including single or multiple position corrections, or pseudorange corrections to each satellite. Correction data is then stripped from correction data stream 44 by transceiver 92. Correction data may be passed to processor 100 over link 95 or over any other appropriate path, such as through bus drivers 112 and modem or dual tone multifrequency (DTMF) coder/decoder 110. Hand set 94 provides traditional voice or data communication using mobile communications device 42.

Processor 100 manages the communicating, locating, and reporting features of mobile unit 17. Processor 100 receives a navigation solution or pseudorange measurements from controller 86 and correction data from transceiver 92. Coupled to processor 100 is memory 102 which may contain programs, databases, and other information required by processor 100 to perform its functions. For example, memory 102 may contain a table of known position coordinates of transmitter sites 40 for use in computing the position of mobile unit 17 in the alternative positioning system 200 described with reference to FIG. 6. Memory 102 may be random access memory (RAM), read-only memory (ROM), CD-ROM, removable memory devices, or any other device that allows storage or retrieval of data.

Processor 100 and controller 86, as well as memory 102 and memory 88, may be separate or integral components of mobile unit 17. For example, controller 86 may include a port that directly receives correction data and allows mobile positioning receiver 24 to output a refined position fix. Mobile unit 17 contemplates any arrangement, processing capability, or task assignment between controller 86 and processor 100.

In operation, processor 100 generates a refined position fix for mobile unit 17 based on the navigation solution or pseudorange measurements from controller 86 and the correction data from transceiver 92. This refined position fix may be sent to output device 104 to generate a moving or static display of vehicle 16 on a map represented by map data stored in memory 102. Alternatively, output device 104 may produce audible information, such as directions or location updates, to the operator of vehicle 16.

Processor 100 is also coupled to input device 106 that allows operation of mobile unit 17. Input device 106 may be a keypad or touch screen, as well as voice recognition software and hardware that can accept audible commands and information. Furthermore, both output device 104 and input device 106 may include fixed or removable storage media, such as magnetic computer discs, CD-ROM, or other suitable media to both receive output and provide input to processor 100.

Figure 5:
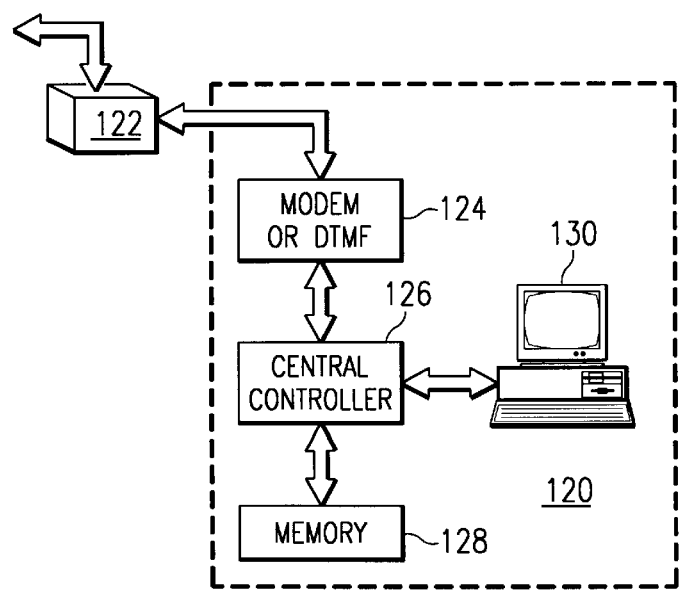
FIG. 5 is a schematic representation of a central host.

Processor 100 may also generate data messages for transmission to a remote location using mobile communications device 42. The data messages may include the refined position fix of mobile unit 17, the time of reporting, or information input by the vehicle operator, as well as any other information collected by processor 100 from various sensors 108. For example, sensors 108 may include various engine sensors, truck trailer sensors, security monitors, or other devices generating information on the status or condition of mobile unit 17, vehicle 16, or its operator. The generation and transmission of a data message may be based on elapsed time, movement of mobile unit 17, sensor readings, or any other piece of information that may necessitate reporting to a remote location. The data messages are sent from processor 100 through modem or DTMF coder/decoder 110 to bus drivers 112, and then to transceiver 92 for transmission over antenna 90 to a remote location, such as central host 120 (FIG. 5). Data messages may also be sent directly to transceiver 92 over link 95.

Mobile unit 17 may also include a clock 116 coupled to processor 100 that may be used to synchronize the navigation solutions or pseudorange measurements received from controller 86 with latent correction data received from transceiver 92. Clock 116 may also be used in alternative positioning system 200 described with reference to FIG. 6. In operation, clock 116 provides accurate time to processor 100, and may receive clock correction updates from mobile positioning receiver 24 or through correction data from mobile communications device 42.

Components of mobile unit 17 shown in FIG. 4 may be packaged into one or more housings. Mobile unit 17 may be mounted to vehicle 16 or an object to be tracked. Mobile unit 17 may also be packaged as a portable, hand-held device that provides personal locating, communicating, and reporting functions. For example, a portable, hand-held mobile unit 17 may be used by surveyors, rescue teams, individuals that may change forms of transportation, or any other application requiring portability of mobile unit 17.

FIG. 5 is a schematic representation of a central host 120. Central host 120 receives communications from mobile unit 17, such as reports generated by processor 100, through link 122. Link 122 may be one or a combination of dedicated telephone lines, switched telephone lines, microwave communications links, satellite-based communications links, or any other suitable communication link that allows mobile unit 17 to transmit data to or receive data from central host 120.

A data message from mobile unit 17 enters central host 120 through a modem or DTMF coder/decoder 124 and passes to central controller 126. Coupled to central controller 126 is memory 128 and input/output device 130. Memory 128 may be RAM, ROM, CD-ROM, removable memory devices, or any other device that allows storage or retrieval of data. Input/output 130 includes any variety of output devices, such as a display, a speaker to provide audible information, removable storage media, or any other appropriate output device. Input/output device 130 may also include a variety of input devices, such as a keyboard, mouse, touch screen, removable storage media, or any other appropriate input device.

Central controller 126 receives data messages from mobile unit 17 and processes this information to locate, track, dispatch, and communicate with mobile unit 17. For example, central controller 126 can maintain a database in memory 128 of all mobile units 17 with their current location, status, and relevant sensor readings. This database can also be used to initiate communication with mobile unit 17. Furthermore, central controller 126 may perform a call delivery function that routes incoming calls to mobile unit 17 through link 122. This aspect of call delivery is fully described in application Ser. No. 08/095,166, entitled "Method and Apparatus for a Nation-Wide Cellular Telephone Network" filed Jul. 20, 1993, and application Ser. No. 08/175,256 entitled "Data Messaging in a Communications Network" filed Dec. 28, 1993, both applications commonly owned by the assignee of the present application, and both applications hereby incorporated by reference.

Figure 6:
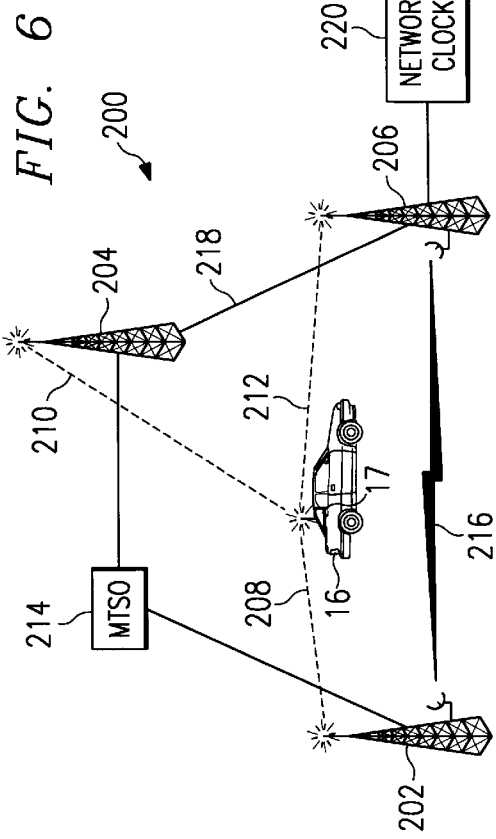
FIG. 6 illustrates an alternative positioning system.

FIG. 6 illustrates an alternative positioning system 200 that utilizes equipment of the existing mobile communications network 14 to locate vehicle 16 equipped with a modified mobile unit 17. Mobile unit 17 communicates with transmitter sites 202, 204, 206 over communications links 208, 210, 212, respectively. Communication links 208, 210, 212 may be the control channel, overhead message stream, or paging channel of a cellular telephone network, a portion or all of a seized voice or data channel, or a dedicated channel. Transmitter sites 202, 204, 206 may be coupled to a network in a variety of ways. For example, transmitter site 202 is coupled to transmitter site 204 over land-line connections through MTSO 214. Transmitter site 202 is coupled to transmitter site 206 over a microwave or other radio link 216. Transmitter site 204 is coupled to transmitter site 206 over a direct or dedicated connection 218.

Positioning system 200 operates in a similar fashion to an aspect of differential positioning system 10 described with reference to FIGS. 1 and 2, but does not rely on a positioning system 12 to transmit navigation data. Instead, transmitter sites 202, 204, 206 transmit time-of-arrival (TOA) data over respective communications links 208, 210, 212. Mobile unit 17 receives TOA data and computes the position of mobile unit 17 using the TOA data and known position coordinates of transmitter sites 202, 204, 206.

The TOA data from transmitter sites 202, 204, 206 may be transmitted in a variety of ways. In one method, a network clock 220 synchronizes the instantaneous transmission of TOA data from transmitter sites 202, 204, 206. Using this method, the time of reception at mobile unit 17 provides pseudorange measurements to transmitter sites 202, 204, 206. As in differential positioning system 10 of FIGS. 1 and 2, a fourth transmitter site allows the position of mobile unit 17 to be computed without regard for a clock bias ($C_B$) between network clock 220 and clock 116 (FIG. 4) maintained on mobile unit 17.

In another embodiment, transmitter sites 202, 204, 206 transmit TOA data at different times, but include the time of transmission in the message to mobile unit 17. Assuming cellular transmitter sites 202, 204, 206 maintain synchronized time through network clock 220, mobile unit 17 can generate pseudorange measurements by comparing the message time of arrival to the time of transmission.

Transmitter sites 202, 204, 206 and mobile unit 17 may have different configurations when operating in positioning system 200. Referring to FIG. 3, transmitter site 40 does not need an associated reference positioning receiver 38 to provide location information in positioning system 200. Transmitter site 40, however, does include TOA data generator 64 and clock 66 to generate the TOA data for transmission to mobile unit 17. Referring now to FIG. 4, mobile unit 17 does not require mobile positioning receiver 24 for operation within positioning system 200. TOA data is received by transceiver 92 and sent to processor 100, which uses the TOA data to compute pseudoranges to cellular transmitter sites 202, 204, 206. Using well-known triangulation techniques described with reference to FIG. 3, processor 100 may then compute a position fix of mobile unit 17 using the pseudoranges and known position coordinates of transmitter sites 202, 204, 206 stored in memory 102.

Although the present invention has been described with several embodiments, various changes and modifications may be suggested to one skilled in the art, and it is intended that the present invention encompass such changes and modifications as fall within the scope of the appended claims.

What is claimed is:

1. A locating system using a cellular telephone network and a positioning system, comprising:

a reference positioning receiver located at a transmitter site of the cellular telephone network, the reference positioning receiver having known position coordinates and operable to receive first position signals from the positioning system, the reference positioning receiver further operable to generate correction data in response to the first position signals and the known position coordinates;

the transmitter site of the cellular telephone network coupled to the reference positioning receiver and operable to receive correction data generated by the reference positioning receiver, the transmitter site operable to transmit in a control channel the correction data generated by the reference positioning receiver; and a mobile unit in communication with the cellular telephone network and the positioning system, the mobile unit operable to receive correction data transmitted by the transmitter site, the mobile unit further operable to receive second position signals from the positioning system and to determine the location of the mobile unit in response to the second position signals and the correction data.

2. The system of claim 1, wherein the known position coordinates of the reference positioning receiver are based on data received by the reference positioning receiver from the positioning system over a statistically significant period of time.

3. The system of claim 1, wherein the correction data comprises a position correction representing a comparison between a position fix based on the first position signals and the known position coordinates of the reference positioning receiver.

4. The system of claim 1, wherein:

the first position signals comprise time-of-arrival data received by the reference positioning receiver from a plurality of satellites; and the correction data comprises pseudorange corrections for each satellite.

5. The system of claim 1, further comprising:

a memory coupled to the mobile unit, the memory operable to store map data; and a display coupled to the mobile unit, the display operable to display the location of the mobile unit and the map data.

6. The system of claim 1, further comprising a central controller coupled to the mobile unit, the central controller operable to receive the location of the mobile unit.

7. The system of claim 1, wherein the mobile unit is mounted on a vehicle.

8. The system of claim 1, wherein the mobile unit is housed in a portable, hand-held housing.

9. The system of claim 1, wherein the mobile unit further comprises:

a mobile communications device in communication with the cellular telephone network, the mobile communications device operable to receive correction data transmitted by the transmitter site;

a mobile positioning receiver coupled to the mobile communications device, the mobile positioning receiver operable to receive second position signals from the positioning system; and a processor coupled to the mobile communications device and the mobile positioning receiver, the processor operable to determine the location of the mobile unit in response to the second position signals received from the mobile positioning receiver and the correction data received from the mobile communications device.

10. A locating system using a mobile communications network and a positioning system, comprising:

a reference positioning receiver located at a first transmitter site of the mobile communications network, the reference positioning receiver having known position coordinates and operable to receive first position signals from the positioning system, the reference positioning receiver further operable to generate correction data in response to the first position signals and the known position coordinates;

the first transmitter site of the mobile communications network coupled to the reference positioning receiver and operable to receive correction data generated by the reference positioning receiver;

a second transmitter site of the mobile communications network coupled to the first transmitter site, the second transmitter site operable to transmit in a control channel correction data received from the first transmitter site; and a mobile unit in communication with the second transmitter site and the positioning system, the mobile unit operable to receive correction data transmitted by the second transmitter site, the mobile unit further operable to receive second position signals from the positioning system and to determine the location of the mobile unit in response to the second position signals and the correction data.

11. The system of claim 10, further comprising a communications link coupled to the first and second transmitter sites, the communications link operable to receive correction data from the first transmitter site and to transmit the correction data to the second transmitter site.

12. The system of claim 10, wherein the known position coordinates of the reference positioning receiver are based on data received by the reference positioning receiver from the positioning system over a statistically significant period of time.

13. The system of claim 10, wherein the correction data comprises a position correction representing a comparison between a position fix based on the first position signals and the known position coordinates of the reference positioning receiver.

14. The system of claim 10, wherein:

the first position signals comprise time-of-arrival data received by the reference positioning receiver from a plurality of GPS satellites; and the correction data comprises pseudorange corrections for each GPS satellite.

15. The system of claim 10, further comprising:

a memory coupled to the mobile unit, the memory operable to store map data; and a display coupled to the mobile unit, the display operable to display the location of the mobile unit and the map data.

16. The system of claim 10, further comprising a central controller coupled to the mobile unit, the central controller operable to receive the location of the mobile unit.

17. The system of claim 10, wherein the mobile unit is mounted on a vehicle.

18. The system of claim 10, wherein the mobile unit is housed in a portable, hand-held housing.

19. The system of claim 10, wherein the mobile unit further comprises:

a mobile communications device in communication with the cellular telephone network, the mobile communications device operable to receive correction data transmitted by the second transmitter site;

a mobile positioning receiver coupled to the mobile communications device, the mobile positioning receiver operable to receive second position signals from the positioning system; and a processor coupled to the mobile communications device and the mobile positioning receiver, the processor operable to determine the location of the mobile unit in response to the second position signals received from the mobile positioning receiver and the correction data received from the mobile communications device.

20. An apparatus for locating a vehicle within the service area of a cellular telephone network and a positioning system, comprising:

a positioning receiver on the vehicle and operable to receive first position signals from the positioning system;

a mobile communications device on the vehicle and coupled to a transmitter site of the cellular telephone network, the mobile communications device operable to receive in a control channel from the transmitter site correction data generated at the transmitter site; and a processor on the vehicle and coupled to the positioning receiver and the mobile communications device, the processor operable to determine the location of the vehicle in response to the first position signals and the correction data.

21. The apparatus of claim 20, further comprising:

a memory coupled to the processor, the memory operable to store map data; and a display coupled to the processor, the display operable to display the location of the vehicle and the map data.

22. The apparatus of claim 20, further comprising a central controller coupled to the mobile communications device, the central controller operable to receive the location of the vehicle.

23. The apparatus of claim 20, wherein the correction data comprises a position correction.

24. The apparatus of claim 20, wherein the correction data comprises pseudorange corrections from a plurality of satellites in the positioning system.

25. A method for locating a mobile unit within the service area of a cellular telephone network and a positioning system, comprising:

receiving first position signals from the positioning system at a reference positioning receiver having known position coordinates, the reference positioning receiver located at a transmitter site of a cellular telephone network;

generating, at the transmitter site, correction data in response to the first position signals and the known position coordinates;

receiving in a control channel, from the transmitter site, correction data at a cellular transceiver in the mobile unit;

receiving second position signals from the positioning system at a mobile positioning receiver in the mobile unit; and determining the location of the mobile unit in response to the second position signals and the correction data.

26. The method of claim 25, wherein the correction data comprises a position correction representing a comparison between a position fix based on the first position signals and the known position coordinates of the reference positioning receiver.

27. The method of claim 25, wherein:

the positioning system comprises a plurality of satellites; and the correction data comprises pseudorange corrections for each satellite.

28. The method of claim 25, further comprising the step of displaying the location of the mobile unit on a map.

29. The method of claim 25, further comprising the step of receiving the location of the mobile unit at a remote location.

30. The method of claim 25, wherein the positioning system is GPS.

* * * * *